(12) United States Patent  (10) Patent No.: US 7,707,126 B2
Klein et al.  (45) Date of Patent: Apr. 27, 2010

(54) MANUAL START LEARNING PROCESS AND MANUAL START PROCESS FOR USE WITH AN AUTOMATED SYSTEM

(75) Inventors: Konrad Klein, Haag (AT); Keith McRitchie, Wolfsbach (AT)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1667 days.

(21) Appl. No.: 10/910,409

(22) Filed: Aug. 3, 2004

(65) Prior Publication Data

US 2006/0031715 A1  Feb. 9, 2006

(51) Int. Cl.
 *G06F 15/18* (2006.01)
(52) U.S. Cl. ........................................... 706/12
(58) Field of Classification Search .................. 706/12
See application file for complete search history.

(56) References Cited

U.S. PATENT DOCUMENTS

| 4,638,227 | A | 1/1987 | Katayama et al. | |
|---|---|---|---|---|
| 6,268,853 | B1 * | 7/2001 | Hoskins et al. | 700/83 |
| 6,556,950 | B1 * | 4/2003 | Schwenke et al. | 702/183 |
| 6,618,856 | B2 * | 9/2003 | Coburn et al. | 717/135 |
| 6,862,553 | B2 * | 3/2005 | Schwenke et al. | 702/183 |
| 6,993,456 | B2 * | 1/2006 | Brooks et al. | 702/183 |
| 7,043,316 | B2 * | 5/2006 | Farchmin et al. | 700/99 |
| 7,266,476 | B2 * | 9/2007 | Coburn et al. | 702/183 |
| 7,437,212 | B2 * | 10/2008 | Farchmin et al. | 700/221 |
| 7,546,232 | B2 * | 6/2009 | Brooks et al. | 702/183 |

FOREIGN PATENT DOCUMENTS

| EP | 0 389 991 | | 3/1990 |
|---|---|---|---|
| EP | 0 389 991 | A2 * | 3/1990 |

OTHER PUBLICATIONS

Software Doucmentation, Part 1, Specification of Diagnostic Control Program (DCP) Release 1.0 (Feb. 1999), Project Ford VE184, pp. 1-84.
Software Doucmentation, Part 2, Specification of Diagnostic Control Program (DCP) Release 1.0 (Feb. 1999), Project Ford VE184, pp. 1-111.

* cited by examiner

*Primary Examiner*—Michael B Holmes
(74) *Attorney, Agent, or Firm*—Quarles & Brady LLP; William R. Walbrun

(57) ABSTRACT

A method and apparatus for use with a system including a processor that controls a resource configuration to perform a sequence including a plurality of cells, the method for programming the processor to help a system operator restart the sequence after the sequence is halted, the method comprising the steps of, during a commissioning procedure, the method including the steps of providing a sequence including at least one conditional section including at least one decision cell that determines which of at least two different subsets of conditional cells (cell subsets) to perform during the at least one conditional section, beginning with the first sequence cell, performing each cell, after each cell is performed, identifying resource operating characteristics (ROCs), correlating the identified ROCs with a cell identifier and storing the identified ROCs as required ROCs along with the cell identifier for subsequent use during a restart procedure.

45 Claims, 7 Drawing Sheets

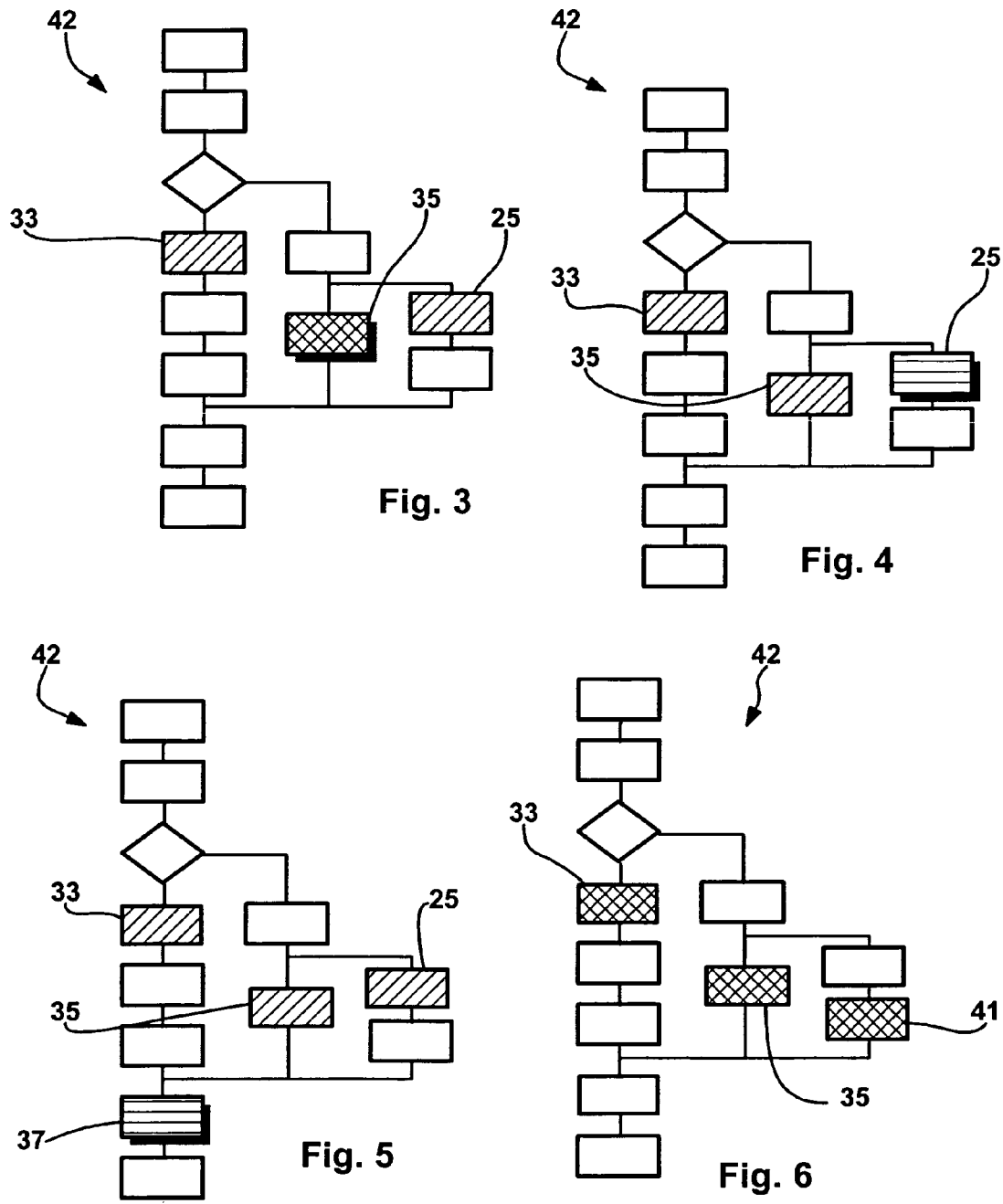

| Cell | Path Specification | Required ROCs |
|---|---|---|
| 1 | NA | Clamp 1 closed<br>Clamp 2 open<br>Clamp 4 closed<br>Drill 1 parked<br>Mill 3 Forward Motion<br>. . . |
| 2 | NA | Clamp 5 open<br>Clamp 6 closed<br>Mill 3 Forward Motion<br>. . . |
| 3 | 1,1,1,1 | Clamp 1 closed<br>Clamp 2 open<br>Clamp 4 closed<br>Drill 1 parked<br>Mill 3 Forward Motion<br>. . . |
| 3 | 1,1,1,2 | Clamp 1 open<br>Clamp 2 open<br>Clamp 4 open<br>Drill 1 forward<br>Mill 3 Forward Motion<br>. . . |

Fig. 9

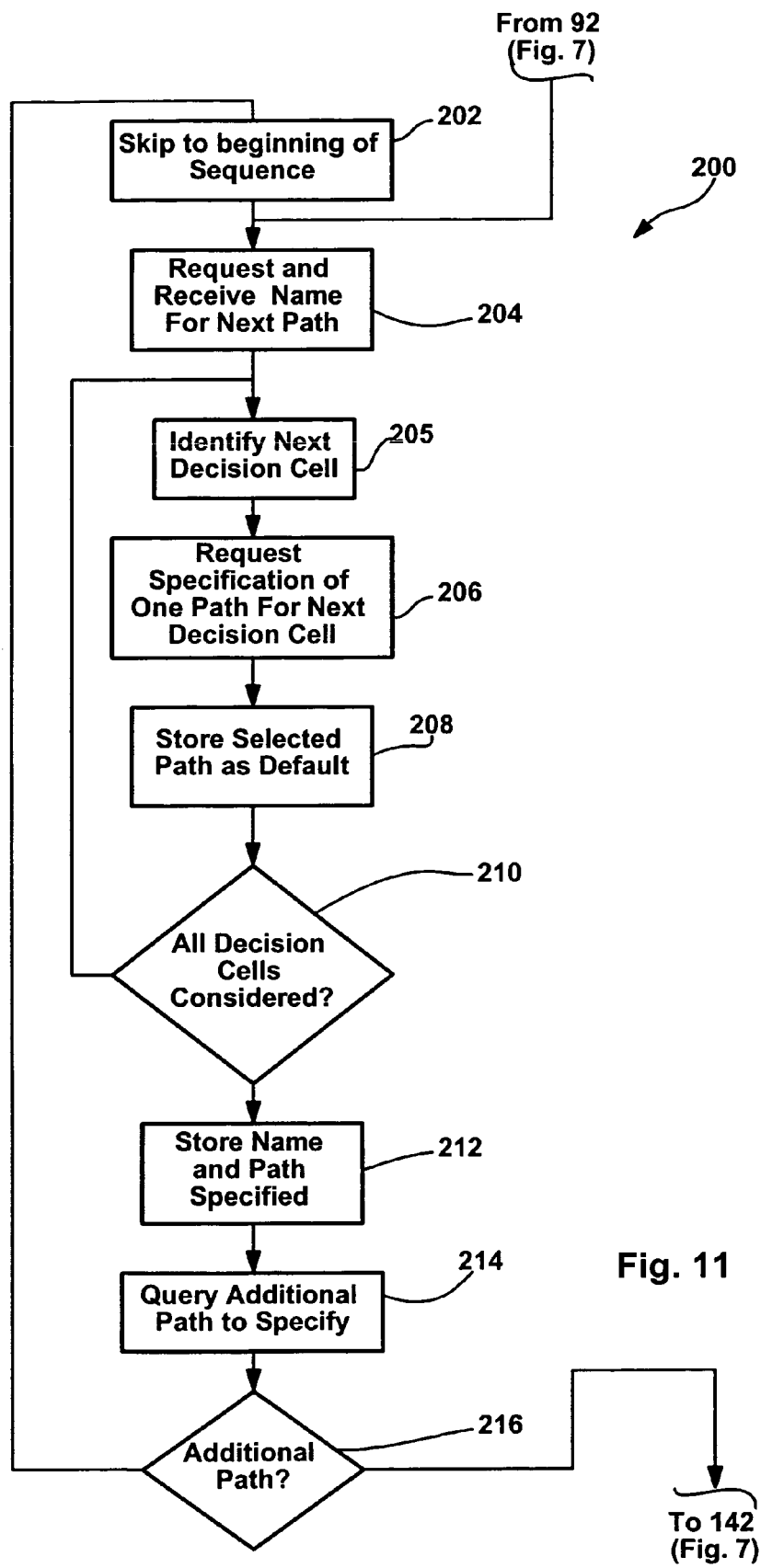

MANUAL START LEARNING PROCESS AND MANUAL START PROCESS FOR USE WITH AN AUTOMATED SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The field of the invention is automated systems and more specifically systems wherein a processor performs a program to control an automated set of resources and, when resource operation is halted, provides guidance regarding how to place the resources in a condition that allows the process to be restarted. The invention also includes a method by which the processor learns how to provide guidance to a system operator.

A typical automated manufacturing system includes a processor or programmable logic controller (PLC), a plurality of automated resources (e.g., machines such as mills, drills, transfer lines, clamps, position sensors, proximity sensors, switches, sprayers, robotic welding arms, etc.) and, in many cases, one or more human-machine interfaces (HMIs) (e.g., display screens and some type of input devices). The resources are configured to perform a process on items or assemblies (e.g., work products) being manufactured, treated, sorted, etc., and are linked to the PLC via I/O lines so that the PLC can command the resources to perform the various process steps and can monitor progress of the manufacturing process. The interface is usually linked to the PLC so that the PLC can provide information to a system operator regarding current and/or historical status of the process and warning indications when unusual operating characteristics occur. In many cases the interface also enables the operator to interact with and control the system by stopping the process, altering process operations and manually manipulating the resources when necessary.

A typical process performed by a PLC and associated resources includes several sequences that are, in general, performed sequentially, with one sequence followed by another which is in turn followed by another sequence, and so on. Each sequence typically includes a plurality of cells.

As indicated above, during performance of a process the PLC runs a program and generates commands provided to the resources to cause the resources to perform their parts of the overall process and receives feedback regarding the current operating characteristics (ROCs) of the resources. Prior to transitioning from one of the cells to the next, the PLC is programmed to determine that all of the resources are in a transition state (I.e., that the ROCs are all in a required state) that is required to commence the next cell. For instance, where a part has to be present in a specific position for a cell to commence, one of the ROCs that has to be met prior to performing the cell may be for a proximity sensor to indicate that a part is sensed at a station associated with the specific position. As another instance, prior to commencing another cell, one of the ROCs that may have to be met may be that each of four clamps be in an extended state so that a work item proximate thereto is completely secured. Hereinafter, unless indicated otherwise, the phrase "required ROCs" will be used to refer to resource characteristics that are required for a cell to commence.

During system operation, if required ROCs do not exist to transition to a next cell, the PLC is programmed to stop the process and indicate, via the interface, that an error has occurred. Thus, for instance, in the example above where required ROCs indicate that each of four clamps have to be in an extended state prior to transitioning to a next cell, if the first and second clamps are extended but the third and fourth clamps are not extended, the PLC will stop the process and provide messages to a system operator indicating that the third and fourth clamps are not extended.

To track required ROCs and current states, interlock software is usually run in the background of the process program software to record resource status changes that occur under control of the program in an interlock table, to routinely identify current ROCs, to compare current ROCs to resource status in the table and to indicate when a resource has changed state independent of the program control. Where a resource status changes outside the program control the associated process is typically halted and an error or warning message is generated.

After observing the warning message, an operator examines the resources to determine the cause of the error. In many cases an operator may have to manually manipulate at least a sub-set of the resources in order to identify the cause of the error and/or to eliminate the cause of the error. Once the cause of the error has been alleviated, the operator can restart the process. In order to restart the process at a specific sequence cell, all of the required ROCs for the preceding cell have to exist.

To help a system operator restart a halted process three similar yet independent features have been developed including a halt cell error stack feature, a manual step restart (MSR) feature and a resequencing feature. The halt cell error stack feature is facilitated by the PLC wherein the PLC identifies required ROCs to restart a halted process at the halt cell, identifies current ROCs, compares the current and required ROCs to identify differences and then generates an error stack via the interface thereby indicating resources that are not in states required to restart at the halt cell. To this end, manual resource movements often result in resources that are out of positions or states required to restart at the halt cell. The stack operates as a guide to indicate steps that should be manually performed to place the resources in the required states to restart. As the resources are manipulated, the PLC determines that stack errors have been eliminated and removes the stack errors from the stack. Once all the stack errors have been eliminated the operator can restart the process at the halt cell.

The MSR feature enables an operator to select virtually any sequence cell in an automatic sequence at which to restart a halted sequence and identifies required ROCs for restarting at the selected cell that do not currently exist. To this end, in at least some cases, after the cause of an error has been eliminated through manual changes in resource states, an operator may choose to manually step through other process steps or even entire sequence cells to manually check for proper operation of station resources. Here, because resource states are manually changed and in fact portions of a sequence may have been manually performed, it may make sense and indeed be optimal to restart a sequence at a cell subsequent to the halt cell. When a cell at which to restart is selected, pursuant to the MSR feature, the PLC identifies required ROCs associated with the selected cell along with current ROCs, compares the required and current ROCs, generates an error stack indicating differences between the required and current ROCs and displays the error stack as a guide for the operator to manipulate the resources required to restart.

The resequencing feature enables an operator to identify any sequence cells that have required ROCs that match current ROCs. In this regard, it may be that during manipulations to eliminate the cause of an error the operator manually stepped the resources completely through one or more of the sequence cells and that therefore the required ROCs for a cell subsequent to the halt cell match current ROCs. In this case restart can be expedited by restarting at the subsequent cell associated with required ROCs that match the current ROCs.

Parallel and conditional processing are two general exceptions to the sequential processing scheme where, as the labels imply, parallel processing includes executing several cells in parallel and conditional processing includes executing at least a sub-set of cells only when certain conditions have occurred. Most industry members have approached parallel and conditional processing by simulating the effects thereof via sequential cell execution. Parallel and conditional simulating programs employ sequential processing and rely on other software to, in effect, simulate parallel and conditional processing. Here, with respect to parallel processing, while a PLC cell may commence parallel processing and other sequential cells may track parallel processing, other processors in addition to the PLC are typically employed to perform the parallel processes. For instance, where four robots are to perform parallel processes, each robot may be provided with its own processor and program and the PLC program may include a cell that starts the parallel robot processes and a subsequent sequential cell that determines if the robot processes have been completed. With respect to conditional processing, these programs have typically included several separate sequences where the PLC or some other processor selects a sequence based on conditional factors as opposed to providing decision or conditional cells within the PLC program itself.

Known systems that simulate parallel and conditional processing include a generally non-graphic interface type (hereinafter "the non-graphic interface") that includes some non-graphic way (e.g., a field or on-screen box) to indicate a number corresponding to a cell (i.e., a cell number) at which to restart a halted process and that provides an error stack or error list to guide an operator during a restart process. Here, each programming cell is labeled with a cell number. During normal operation of a process, the PLC tracks the current or active cell number and indicates that number via the interface. When the process stops, the PLC displays the halt number for the operator to observe along with a way to select a different cell number for restart.

Systems that only simulate parallel and conditional processing have several shortcomings. First, because these systems rely on processors and processes in addition to the PLC and the processes directly performed by the PLC, they are relatively more complex to program and overall system coordination is generally more complex. Second, most systems of this type only support a limited number of possible programming branches and hence cannot be easily used for certain application types.

One solution to the problems associated with systems that simulate parallel and conditional cell execution has been to develop programs and related systems that support true parallel and conditional programming. Programs that support true parallel and conditional processing include sequences that actually include parallel cells and decision or conditional cells that can branch off to other sub-sets of cells to perform different functions and sub-processes based on various conditions and factors. True parallel and conditional processing is much more flexible than simulated parallel and conditional processing and simplifies the programming task appreciably.

To interface with PLCs that support true parallel and conditional programming a graphical interface has been developed. In addition to including an error stack as a guide to restarting a halted process, an exemplary graphical interface graphically provides a flow chart that illustrates the sequence cells linked by lines that signify sequence flow from one cell to the next or to several parallel cells or sequence branches where decision blocks occur. In this case, when a sequence halts at a cell, a flow chart including the halt cell as well as cells before and after the halt cell is provided via a display and the halt cell is typically visually distinguished (e.g., highlighted) in some fashion on the display screen for viewing by an operator.

While systems that support true parallel and conditional processing and that include graphical interfaces for communicating with operators and for facilitating restart processes seem simple enough, unfortunately even these systems have shortcomings and are complicated in a number of ways. First, most PLCs have to support many different applications and many of those applications are critical to proper run time operation of the resources. Whenever possible it is desirable to reduce the percentage of PLC resources dedicated to non-critical tasks and applications. In the case of error messaging and restart processes, messaging and restart processes are generally considered non-critical. Known systems have used the PLC to support all messaging and restart processes which disadvantageously ties up PLC capabilities.

Second, while true parallel and conditional processing has many advantages, known graphical interfaces have not been successfully developed to support the MSR and the resequencing features where true parallel and conditional cell execution occurs. One impediment to supporting the MSR and resequencing features where true parallel and conditional cell execution occurs has been identifying required ROCs for restarting within a parallel section of a sequence. To this end, assume a parallel section of a sequence including seven branches where each branch includes seven sequential cells. With respect to the MSR feature, while known graphical interfaces can highlight a set of halt cells including one cell in each branch for a total of seven cells, the interfaces provide no way to alter the cell sub-set selected for restarting purposes. Instead, when the process halts, the interface only supports restarting at the halt cells. With respect to the resequencing feature, in the context of a parallel section of a sequence, the processing requirement for identifying the different combinations of required ROCs for restarting a process at least cell and at each sub-set of cells in parallel branches of a sequence has been considered too great to be support via the PLC.

Third, there are complexities involved with identifying required ROCs for restart at cells where true conditional cell execution is included in a process. To this end, in the above example where a user wishes to restart the process at a cell subsequent to a halt cell, when the operator selects the subsequent cell for restart, in order to identify the required ROCs associated with the selected cell, the PLC was programmed to virtually run the halted sequence to identify the required ROCs for restarting at the selected cell. This process usually required the PLC to start the virtual sequence in a known state by carrying out a virtual execution of a "home sequence" (i.e., a sequence that places the resources in a known state) before beginning virtual execution of the automatic sequence and continuing execution up to the point of the selected restart cell.

Unfortunately, in at least some cases virtual determination of required ROCs is severely complicated when a program includes multiple possible processing branches (i.e., one or more nested decision cells) as the virtual determination has to select which of two or more branches to assume while working its way through the process from the home sequence to the selected cell. The complexity of the decision regarding which of two or more processing branches to assume is exacerbated in the case of relatively newer control processes where branch decisions can be made on the basis of many different factors including, among others, status of assemblies both locally located and located at remote stations, simple Boolean expressions, logical mathematical operations and other factors that cannot be automatically simulated during the virtual cell execution. For instance, in the case of a decision cell where first and second branches are performed when first and second conditions occur at a remote station, respectively, if neither the first nor the second conditions exist at the remote station when the decision cell is virtually performed, the virtual processing to identify the required restart ROCs will fail to execute past the decision cell and the attempt to generate an error stack will fail.

Thus, it would be advantageous to have a system wherein non-critical restarting processes are supported at least in part by other than the PLC, where both parallel processing and an MSR feature are supported in a system that enables true parallel and conditional cell execution and where decision cell errors that could occur during virtual cell execution due to insufficient knowledge about factors associated with the decision cells are avoided.

BRIEF SUMMARY OF THE INVENTION

It has been recognized that a cell-ROC table can be generated during a commissioning procedure and prior to normal operation of a PLC that includes ROC sub-sets required for restart for each cell in a sequence and, in at least some cases, for each sub-set of possible cells in a parallel section of a sequence. In at least some embodiments the cell-ROC table can be generated by virtually executing the sequence cell by cell and, after a cell is executed, storing a cell identifier along with the resulting ROCs in the table.

It has also been recognized that most interfaces have at least some capability to store programs and data and that the cell-ROC table can be stored in the interface along with restart software thereby freeing up the PLC for critical operations. Thus, when a process halts, the PLC can indicate current or active cells to the interface which can visually distinguish or highlight the active cells on the interface. The PLC can also identify current ROCs and present those ROCs to the interface. The interface, in at least some embodiments, can identify the ROCs associated with the active cell, compare the active cell ROCs with the current ROCs and generate the error stack thus freeing up the PLC. In other cases the PLC may obtain the active cell ROCs from the interface memory, compare the active cell ROCs and the current ROCs to identify errors and then provide the errors to the interface for display in the stack.

Moreover, it has been recognized that simple tools can be provided to enable an operator to select virtually any cell or a sub-set of parallel cells for restart. In this regard, in at least some embodiments on screen and screen selectable arrow icons can be provided that, when selected, allow the operator to move up, down and laterally on a displayed flow chart to select any one of the cells or possible cell sub-sets.

Furthermore, in at least some cases it is contemplated that the interface may be programmed to provide immediate visual queues from which a system operator can identify the relationship between current and required ROCs for selected cells. In this regard, for instance, where an active cell is indicated via a blue coloring, when the active or some other cell is selected via the interface, the selected cell may be highlighted differently as a function of the relationship between the current and required ROCs for the selected cell. For example, where the required ROCs associated with a cell match the current system ROCs, the selected cell may be colored green while, if one or more required ROCs for a selected cell do not match current system ROCs, the selected cell may be colored yellow and stack errors may be provided.

In addition, it has been recognized that where a PLC virtually executing cells cannot determine the status of conditional factors, a system operator can manually identify system factors that can in turn be used to identify required restart ROCs for one or a sub-set of selected restart cells. To this end, in at least some cases, when a process halts and a potential restart cell is selected, the interface may be programmed to identify conditional cells and pose questions to the operator regarding conditional factors. Once all conditional factors have been identified by the operator, the interface may identify the required re-start ROCs for the selected cell as a function of the conditional factors and present an appropriate error stack.

Where ROCs associated with cells that follow a conditional section of a sequence are identical independent of the which conditional branch occurs, the interface may be programmed to assume one of the conditional branches irrespective of which branch actually occurred for the purposes of identifying required ROCs for cells subsequent to the conditional section. Here, the requirement for the operator to select a conditional branch can be avoided and the restart process can be further streamlined.

To program the interface to present conditional factors to an operator during a restart process and to select one conditional path when ROCs corresponding to cells after a conditional sequence section are independent of which conditional branch executed, it is contemplated that during the commissioning process as the PLC virtually executes the cells, when a conditional or decision cell is reached, the PLC will present the operator/commissioner with choices designed to guide an operator subsequently during a restart process. Exemplary commissioning processes to program the interface for restart guidance are described in greater detail hereafter.

An exemplary embodiment of the invention includes a method for use with a system including a processor that controls a resource configuration to perform a sequence including a plurality of cells, the method for programming the processor to help a system operator restart the sequence after the sequence is halted, the method comprising the steps of, during a commissioning procedure providing a sequence including at least one conditional section including at least one decision cell that determines which of at least two different subsets of conditional cells (cell subsets) to perform during the at least one conditional section, beginning with the first sequence cell, performing each cell, after each cell is performed, identifying resource operating characteristics (ROCs), correlating the identified ROCs with a cell identifier and storing the identified ROCs as required ROCs along with the cell identifier for subsequent use during a restart procedure.

At least some embodiments include a method for use with a processor that controls a resource configuration to execute a sequence that includes a plurality of cells, the method for generating a database including resource operating characteristics (ROCs) associated with each of the cells that are required prior to the process being restarted at the associated cells, the method comprising the steps of, during a commissioning procedure executing the sequence cells in the order specified by the sequence and, for each cell, determining the ROCs after to executing the cell, correlating the ROCs and the cell and storing the correlated ROCs and cell in the database for subsequent use.

At least some embodiments of the invention also include a method for use with a processor that controls a resource configuration to perform a sequence that includes a plurality of cells where there are cell specific resource operating characteristics (ROCs) that are required prior to associated cells being performed, the method for guiding a configuration operator to place the resources in a condition suitable for restarting the sequence after the sequence is stopped, the method comprising the steps of, when the sequence stops during a first cell, providing a database that correlates cells with cell specific ROCs (cell ROCs) required to restart the sequence at the associated cell, identifying a cell at which to restart the process, accessing the database and identifying the cell ROCs associated with the identified cell, identifying the current ROCs, comparing the current ROCs and the identified cell ROCs to identify and differences and, where differences exist, indicating the differences to a system operator.

Moreover, at least some embodiments include a method for use with a processor that controls a resource configuration to perform a sequence where the sequence includes a plurality of cells where cell specific resource operating characteristics (ROCs) are required prior to associated cells being performed, the method comprising the steps of, during a commissioning procedure, for at least a subset of conditional sections of the sequence, requesting information from an operator regarding at least two paths through the conditional section, performing the sequence via the processor to identify cell specific ROCs (cell ROCs) for each of the cells as a function of the information regarding the at least two paths and storing each of the cell ROCs with associated cell identifiers and conditional section path identifiers in a database and, subsequent to the commissioning procedure and during performance of the program to control the resources to perform the sequence, when the sequence halts, using the database to identify required ROCs that are required to restart the sequence.

Furthermore, at least some embodiments include a method for use with a processor that controls a resource configuration to perform a sequence that includes a plurality of cells where there are cell specific resource operating characteristics (ROCs) that are required prior to associated cells being performed, the method for guiding a configuration operator to place the resources in a condition suitable for restarting the sequence after the sequence is stopped, the method comprising the steps of, when the sequence stops at a first cell or first set of cells, proving a graphical representation of at least a subset of the sequence cells via a display, receiving a selection of at least one of the displayed cells from a system operator other than the first cell or set of cells at which to restart the sequence and identifying ROCs required for restarting the sequence at the at least one selected cell.

In addition, at least some embodiments include a method for use with a processor that controls a resource configuration to perform a sequence that includes a plurality of cells where there are cell specific resource operating characteristics (ROCs) that are required prior to associated cells being performed, the method for guiding a configuration operator to place the resources in a condition suitable for restarting the sequence after the sequence is stopped, the method comprising the steps of providing an interface including an interface database, identifying ROCs required for restarting the sequence at least a subset of the sequence cells and storing correlated cell identifiers and required ROCs in the interface database for subsequent use.

Some embodiments contemplated also include a method for use with a processor that controls a resource configuration to perform a sequence that includes a plurality of cells where there are cell specific resource operating characteristics (ROCs) that are required prior to associated cells being performed, the method for guiding a configuration operator to place the resources in a condition suitable for restarting the sequence after the sequence is stopped, the method comprising the steps of, when the sequence halts, identifying the current resource ROCs, attempting to identify at least one cell associated with ROCs required to restart the sequence where the required ROCs match the current ROCs and where at least one cell is associated with ROCs required to restart the sequence where the required ROCs match the current ROCs, presenting a flow chart of at least a section of the sequence including the at least one cell wherein the at least one cell is visually distinguished from the other section cells.

Moreover, some embodiments include a method for use with a processor that controls a resource configuration to perform a sequence that includes a plurality of cells where there are cell specific resource operating characteristics (ROCs) that are required prior to associated cells being performed, the method for guiding a configuration operator to place the resources in a condition suitable for restarting the sequence after the sequence is stopped, the method comprising the steps of, when the sequence halts, identifying the current resource ROCs, graphically representing at least a section of the sequence including the at least one cell at which the sequence halted via a display screen, providing a selection tool for selecting at least one graphically represented cell, when one of the cells is selected via the selection tool, identifying ROCs required to restart the sequence at the selected cell, comparing the current and required ROCs to identify differences and providing at least some indication regarding the results of the comparison of the current and required ROCs.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 3 is a sequence flowchart illustrating certain aspects of the present invention;

FIG. 4 is a is similar to FIG. 3, albeit illustrating another aspect of the present invention;

FIG. 5 is a similar to FIG. 3, albeit illustrating one additional aspect of the present invention;

FIG. 6 is a similar to FIG. 3, albeit illustrating one other aspect of the present invention;

FIG. 9 is a schematic diagram of a database or table generated by at least one method of the present invention;

FIG. 11 is a flowchart illustrating a subsection of a learning process that may be substituted for a portion of the flowchart of FIG. 7.

DETAILED DESCRIPTION OF THE INVENTION

Figure 1:
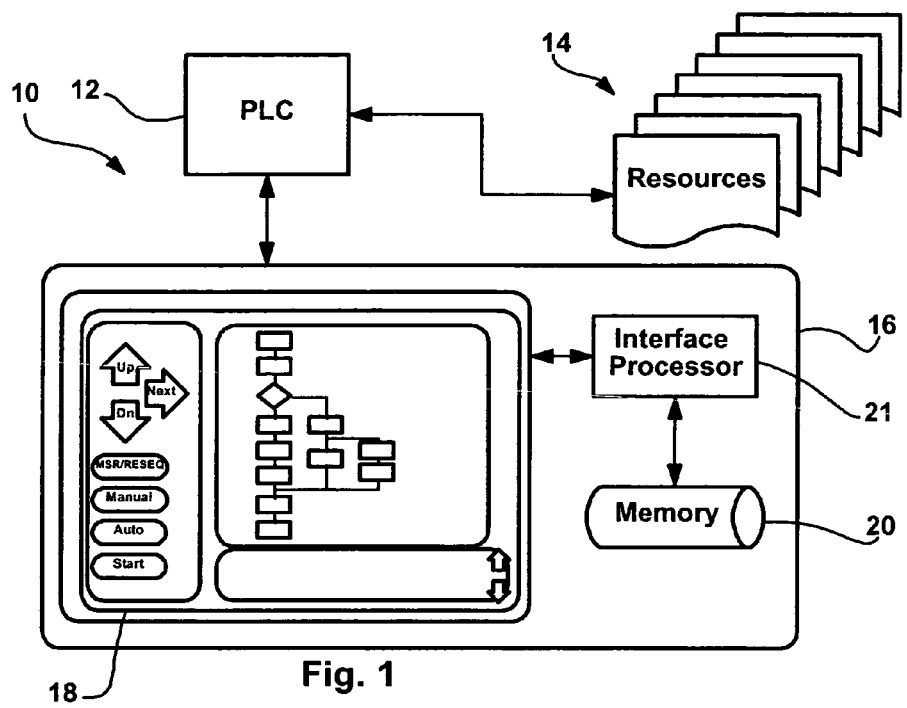
FIG. 1 is a schematic diagram illustrating an exemplary system according to one aspect of the present invention.

Referring now to the drawings wherein like reference numerals correspond to similar elements throughout the several views and, more specifically, referring to FIG. 1, the present invention will be described in the context of an exemplary automated control system 10 including a programmable logic controller (PLC) 12 that is linked to a plurality of resources 14, typically at one or more machine line stations, for control of the resources and for monitoring resource operations and operating characteristics (ROCs) and an interface 16 linked to PLC 12. Interface 16 enables a system operator to monitor operation of PLC 12 and resources 14 and, in at least some cases, to manually control resources 14 for, in addition to other purposes, placing the resources 14 in states that are required for restarting a process performed by the resources pursuant to a program or sequence run by PLC 12.

Figure 10:
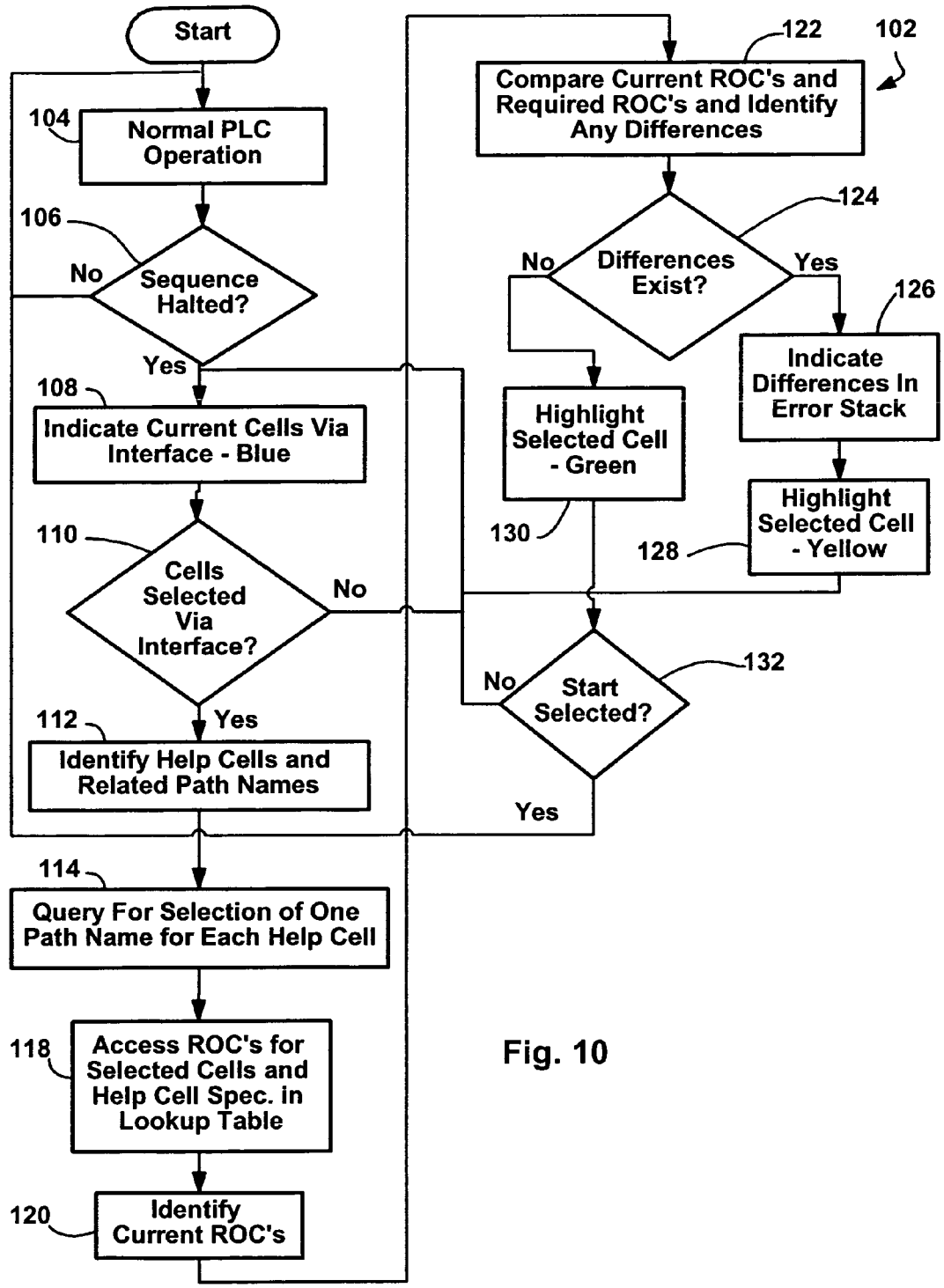
FIG. 10 is a flowchart illustrating a restart process according to at least some aspects of the present invention.

Interface 16 includes, among other things, a video display unit 18, an interface processor 21 and a memory 20. Interface processor 21 performs various programs required to provide certain applications to a system operator via display 18. The programs run by processor 21 are, in general, stored in memory 20. In at least some embodiments of the present invention, in addition to programs, one or more databases to be used to help a system operator restart the process performed by processor 12 when the process is halted for some reason are stored in memory 20. An exemplary database 170 is illustrated in FIG. 10 which is described in greater detail below.

Figure 2:
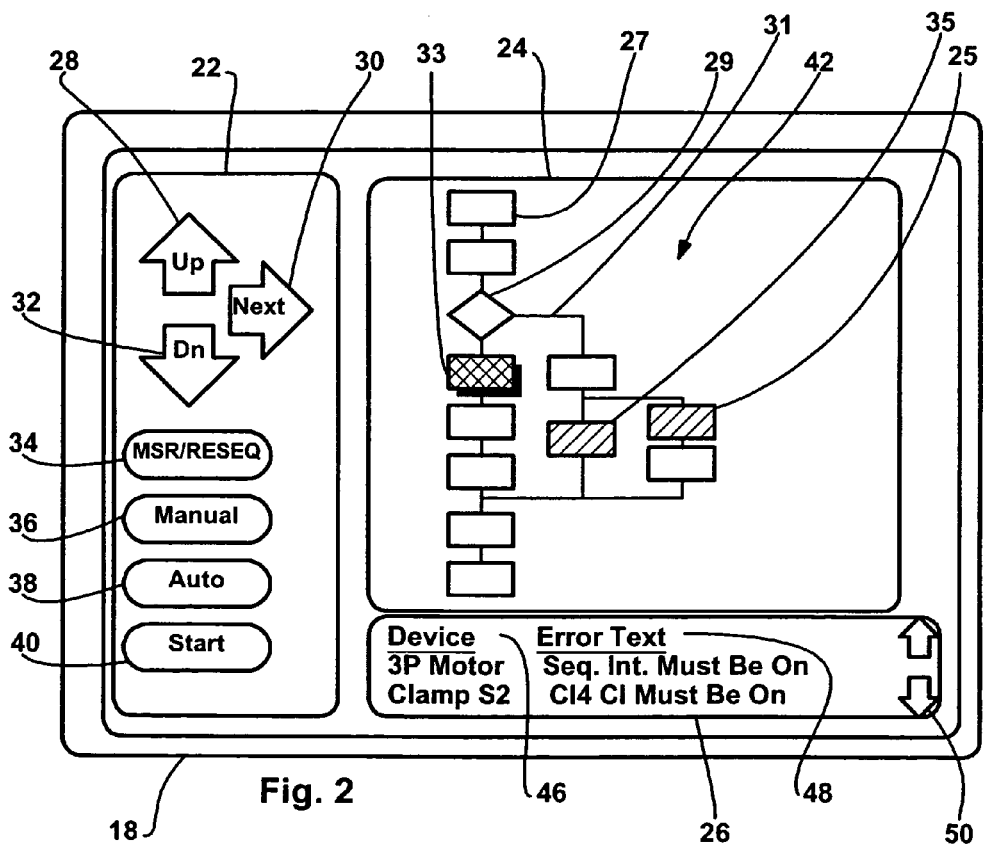
FIG. 2 is a screenshot illustrating an exemplary interface display including a sequence flowchart, an error stack and a compliment of restart icons consistent with as least some aspects of the present invention.

Referring still to FIG. 1 and also to FIG. 2, an exemplary screen shot that may be presented by display 18 is illustrated in FIG. 2. The exemplary screenshot includes two graphic fields and one text field. The two graphic fields include a control panel field 22 and a cell flow chart field 24. The text field 26 provides an error stack or other textual information to a system operator when the sequence performed by PLC 12 is halted. Flow chart field 24, as the label implies, graphically presents a flow chart related to at least a section or segment of a program sequence performed by PLC 12. In FIG. 2, the section of a sequence is identified generally by numeral 42. As a program or sequence is performed by processor 12, if the flow chart associated with the sequence is too large to fit within flow chart field 24, the flow chart representation scrolls along with the process so that an active cell (i.e., a cell currently being executed) along with cells immediately before and immediately after the active cell is always presented via field 24. In at least some embodiment, the active cell or cells (e.g., in the case of executing cells during a parallel processing section of the sequence, more than one cell is executed at the same time) may be indicated in a visually distinct manner by highlighting or changing the color of the active cell or cells within field 24. When the sequence being performed by processor 12 halts or stops for some reason, the currently active cells in flow chart 42 remain visually distinguished. Hereinafter, unless indicated otherwise, it will be assumed that currently active cells are visually distinguished in field 24 by rendering the blocks associated therewith in the flow chart 42 blue while inactive cells are generally displayed as black blocks. Also hereinafter, blue colored cells will be identified by left to right upward crosshatched cells. For example, consistent with the convention above, cell 25 in FIG. 2 is active.

Referring still to FIG. 2, process cells are identified by rectangles (e.g., see 27) while decision or conditional cells are identified by diamonds (only one shown in FIG. 2 and identified by numeral 29). Lines (e.g., 31) connect cells to indicate flow from one sequence cell to the next.

Referring again to FIG. 2, a plurality of touch-selectable control panel icons are provided in control panel field 22 including an UP icon arrow 28, a DOWN arrow 32, a NEXT or lateral icon arrow 30, a MSR/RESEQUENCE icon 34, a MANUAL icon 36, an AUTO icon 38 and a START icon 40. When a sequence is halted, one of the active cells is indicated as currently selected by visually distinguishing that cell from the other cells in flow chart 42. For example, in FIG. 2, active cell 33 has a shadow as illustrated to distinguish active cell 33 from the other active cells indicated by left to right upward cross-hatching.

Arrow icons 28, 30 and 32 are usable to move from one cell to another cell in the displayed sequence 42. For example, to move from cell 33 to cell 35, an operator can use NEXT arrow icon 30 to jump from the sequence branch including cell 33 to the sequence branch including cell 35 and then can use DOWN icon 32 to move down to cell 35. As the selected cell is changed, the shadow follows the selected block. To this end, referring also to FIG. 3, when block 35 is selected, the shadow is removed from block 33 and is added to block 35. Similarly, referring to FIG. 4, when block 25 is selected, the shadow follows that block. In FIG. 5 block 37 is selected and the shadow follows.

In at least some embodiments of the present invention it is contemplated that when a cell is selected via interface 18, the interface processor 21 determines whether or not the ROCs required to restart the halted process at that cell match current ROCs and to give a visual queue to the system operator regarding whether or not the current and required ROCs match. To this end, it is contemplated that when a sequence cell is selected, the cell appearance will be altered to indicate that the current and required ROCs match or that at least one of the current ROCs does not match a corresponding one of the required ROCs. Hereinafter, it will be assumed that when a sequence cell is selected and current ROCs match the ROCs required to restart the process at that cell, the cell will be visually distinguished by changing the cell color to green and where the current ROCs do not precisely match the ROCs required to restart a halted process at a selected cell, the mismatch will be indicated by changing the selected cell color to yellow.

In the figures, green cells are identified by a double cross-hatch and yellow cells are graphically identified by horizontal hatching. Thus, for instance, in FIG. 1, where cell 33 is selected, cell 33 is double hatched indicating that the current ROCs match the ROCs required to restart the halted process that are associated with cell 33. In FIG. 4 where cell 25 is selected, the horizontal hatching indicates a yellow color which means that the current ROCs do not match the ROCs required to restart the halted process that are associated with cell 25.

When a cell is selected and the current ROCs do not match the required ROCs corresponding to the selected cell, interface 16 presents an error stack or list in stack field 26 including a device column 46 and an error text column 48. Device column 46 identifies resources associated with the selected cell having characteristics that are not consistent with the required ROCs for restarting the sequence at the selected cell.

For example, two exemplary devices or resources identified in column 46 include a three-position motor and a clamp station 2. Error text column 48, as the label implies, includes a separate textual error for each one of the devices or resources identified in column 46. For example, with respect to the three position motor, the error text in column 48 indicates that "sequence interlock position must be ON". The error text is presented in a manner that will be understandable by the operator and will help the operator to render the current ROCs consistent with the ROCs required to restart the process at the selected cell. In the illustrated embodiment, in addition to the error stack, UP and DOWN arrow icons collectively identified by numeral 50 are provided for scrolling through the error stack where all of the errors cannot simultaneously be displayed in field 26.

Referring still to FIG. 2, manual icon 36 can be used to place operation of the system 10 in a manual mode whereby the system operator can manually change the states of the resources. AUTO icon 32 similarly can be selected to place the system 10 in an automatic mode where PLC 12 controls system operation. START icon 40 is selected to start or restart the process performed by PLC 12. MSR/RESEQUENCING icon 34 is selectable after the process performed by PLC 12 halts to help the operator place the resources in states suitable for restarting the process. To this end, after the process halts, the operator may select MANUAL icon 36 to place system 10 in the manul mode. Thereafter, the operator may select icon 34 to obtain help in restarting the process. When the system is in manul mode and icon 34 is selected, the operator is selecting the manul step restart (MSR) feature. In the alternative, if the system 10 is in the automatic mode when icon 34 is selected, the operator is selecting the resequencing feature.

When the MSR feature is selected, as described above, the operator can use arrow icons 28, 30 and 32 to select any cell or set of cells in the case of a parallel section of the sequence 42 at which to restart the process. When a cell or set of cells is selected, in at least some embodiments of the present invention, the interface processor 21 identifies mismatches between ROCs required by the selected cell or cells and current ROCs and provides the error stack in field 26. As the operator performs tasks corresponding to the error text in column 48 of the stack, the errors within the stack are removed until the stack is completely blank. Once a stack is completely blank, the selected cell changes from yellow to green providing a visual queue that the process can be restarted at the selected cell.

When the resequencing feature is selected, the PLC 12 identifies current ROCs and provides a list of the current ROCs to the interface processor 21. Thereafter, interface processor 21 compares the current ROCs to ROCs corresponding to each cell or parallel set of cells in the sequence 42 at which the process may be restarted. Where the current ROCs match ROCs corresponding to one of the cells or sets of cells at which the process may be restarted, interface processor 21 indicates the identified cell or set of cells by visually distinguishing the cell or cells from the other sequence cells. Referring to FIG. 6, an exemplary appearance of sequence 42 where the interface processor 21 is providing a visual queue corresponding to a set of cells having required restart ROCs that match current ROCs is illustrated where, consistent with the convention above, each of cells 33, 35 and 41 are identified by double cross-hatching to indicate green cells. Where the current ROCs do not match any of the ROCs corresponding to one of the cells or a set of the cells at which the process may be restarted, interface processor 21 provides a message via text field 26 indicating that some other procedure has to be performed to restart the halted process such as, for example, a MSR procedure.

Next, a commissioning or "learning" procedure for generating a cell-ROC table for use by interface processor 21 will be described. To this end, referring to FIGS. 7 and 8, a commissioning process 80 for virtually executing sequence cells to identify associated ROCs and for dealing with complexities associated with supporting decision or conditional processing is illustrated. Herein, in at least some embodiments it is contemplated that PLC 12 and interface processor 21 would together perform the virtual cell execution, data correlating, storing and compiling processes associated with the method of FIGS. 7 and 8 and that the learning process would result in a table like the table of FIG. 9 which is described in greater detail below.

Figure 7:
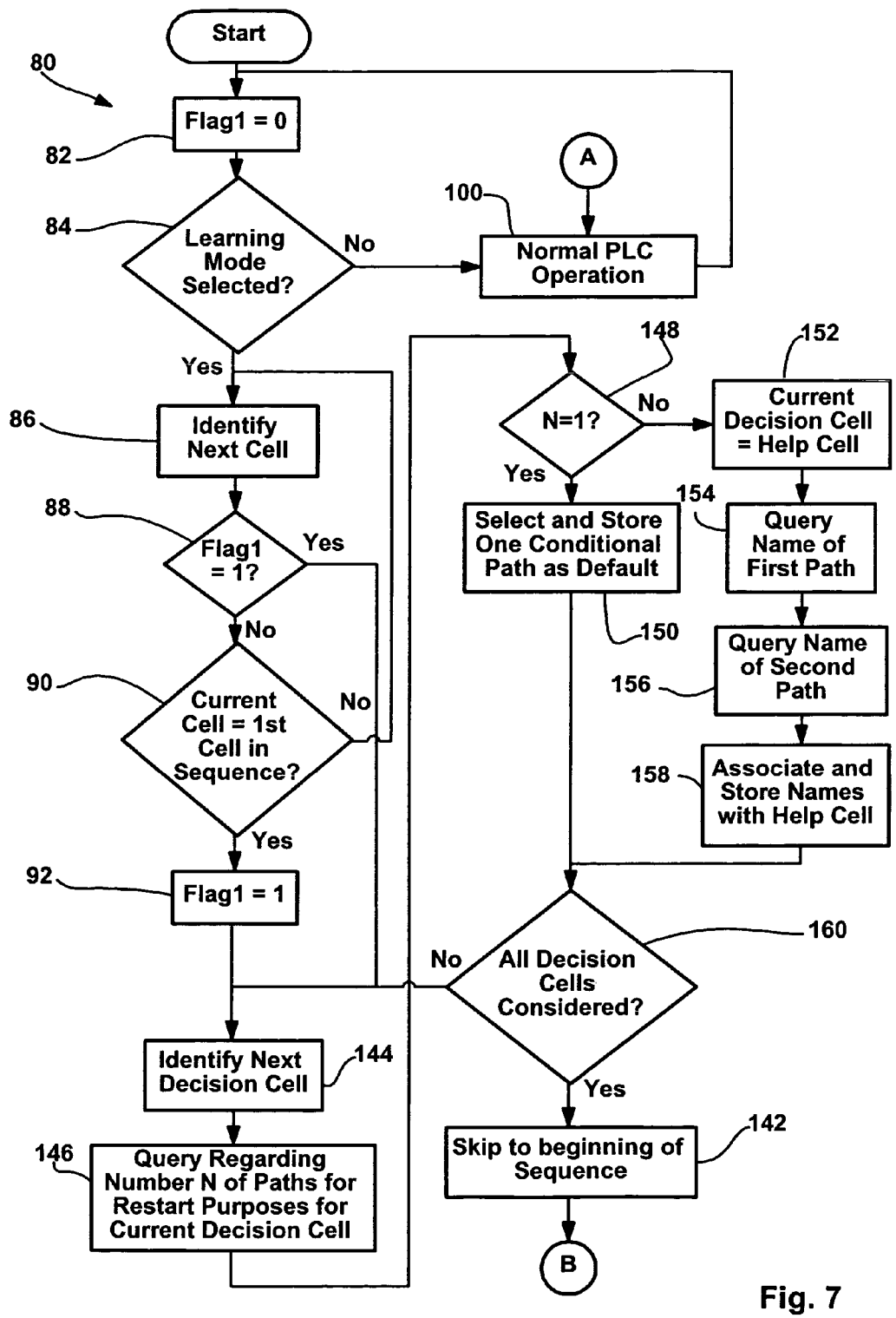
FIG. 7 is the first part of a learning process flowchart according to at least some aspects of the present invention.
Figure 8:
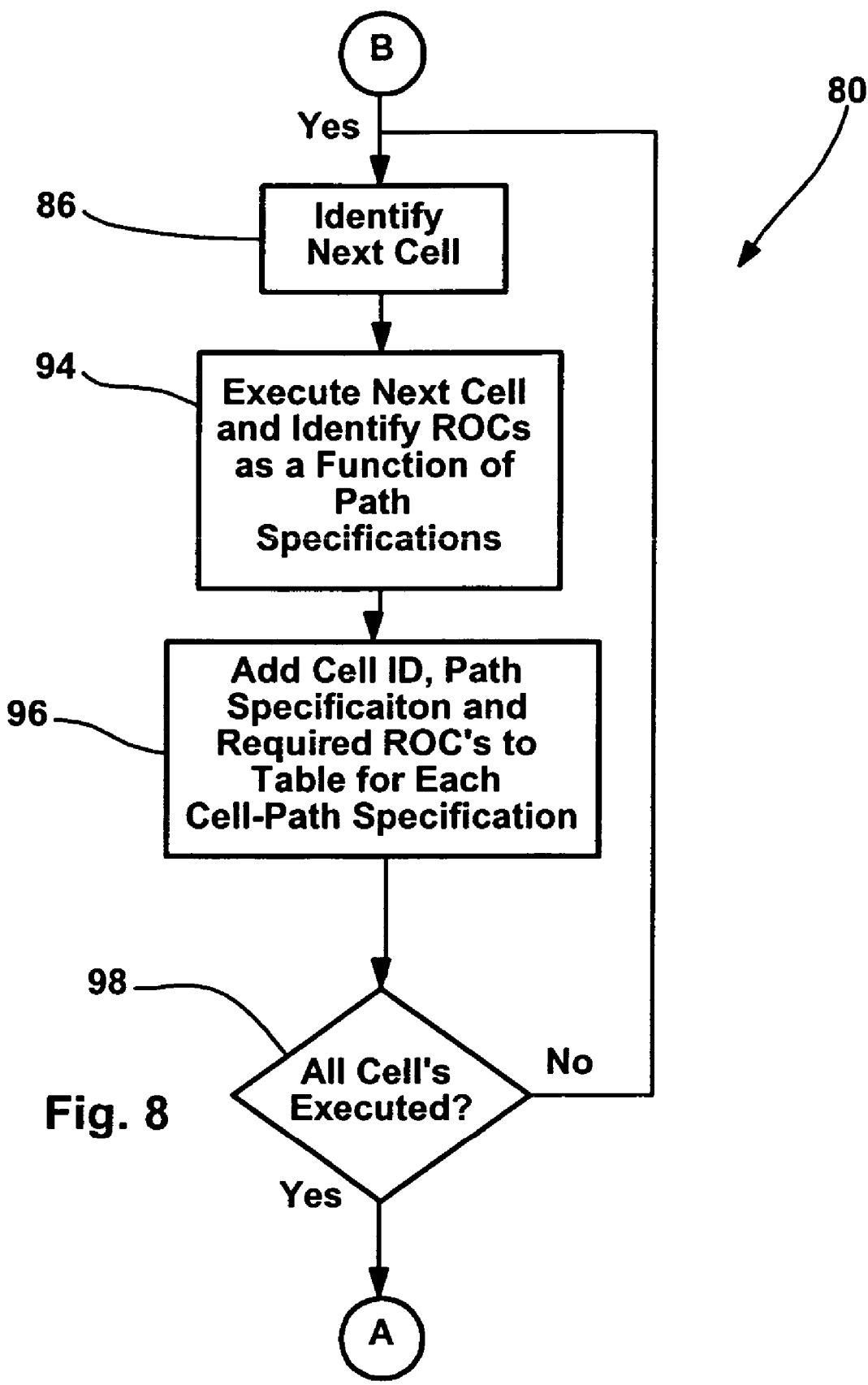
FIG. 8 is the second part of the flowchart of FIG. 7.

Referring to FIGS. 1, 7 and 8, at block 82, processor 21 sets a flag Flag1 equal to zero. Flag1 is used to track and identify the first cell in a sequence for which ROCs are being identified when a "learning mode" of PLC operation is selected. After block 82, control passes to decision block 84 where processor 21 determines whether or not the learning mode has been selected. Where the learning mode has not been selected, control passes to block 100 where normal PLC operation continues. The loop including blocks 82, 84 and 100 continues until the learning mode is selected at block 84.

After the learning mode is selected at block 84, control passes to block 86 where PLC 12 identifies the next cell in the current sequence. After block 86, control passes to block 88 where processor 21 determines whether or not Flag1 is equal to 1. Where Flag1 is not equal to 1, control passes to decision block 90 where processor 21 determines whether or not the current cell is the first cell in the sequence. Where the current cell is not the first cell in the sequence, control passes back up to block 100 where normal PLC operation continues. Once the current cell is equal to the first cell in the sequence, control passes to block 92 where Flag1 is set equal to 1 after which control passes to block 144. Thus, after the current cell equals the first cell in the sequence and Flag1 is set equal to 1 at block 92, the next time through block 88, blocks 90 and 92 are skipped and control passes from block 88 down to block 144 as Flag1 will be equal to 1 at block 88.

At block 144, processor 21 identifies the next decision or condition cell in the sequence (i.e., the next diamond shaped cell in the sequence flow chart—see 29 in FIG. 2). At block 146, processor 21 provides a query to the system operator via the interface display 18 requesting that the operator identify the number of paths N for restart purposes for the current decision cell. Here, in addition to the text query, processor 21 may present the section of the sequence flow chart corresponding to the decision cell associated with the query and other cells proximate thereto in the sequence where the associated decision cell is highlighted. In addition, the operator may be able to select the decision cell or other displayed cells in the flow chart via arrow icons 28, 30 and 32 or the like to receive contextual information about the subprocesses performed by those cells so that the operator can make an informed decision regarding how many paths should be available for the decision cell for restarting purposes. It is contemplated that in at least some cases only one path through the conditional paths that follow a decision cell may be required for restart purposes. For example, in at least some cases there may be an automatic-high speed conditional path and a manual-low speed conditional path and it may be desirable to always assume the low speed path during a restart procedure.

Here, the operator is limited to selecting either one path or two paths for each of the decision cells. At block 148, where the operator selects a single path and therefore N is equal to 1, control passes to block 150 where the operator selects one of the conditional paths as a default path corresponding to the current decision cell and processor 21 stores the selected path. After block 150, control passes to block 160.

Referring once again to block 148, if the operator selects two paths for restart purposes for the current decision cell, control passes to block 152 where processor 21 identifies the current decision cell as a help cell meaning that help will be required from a system operator during subsequent restart procedures to identify which of the two possible paths the processor 21 should assume during the procedure. At block 154, the processor 21 queries the operator to name the first path. Similarly, at block 156, processor 21 queries the operator to name the second path. At block 158, processor 21 associates and stores the names provided by the operator with the specific help cell paths associate therewith. After block 158, control passes to block 160.

At decision block 160, processor 21 determines whether or not all of the decision cells have been considered. Where all of the all of the decision cells have not been considered, control passes back to block 144 where processor 21 identifies the next decision cell and repeats the process described above. At block 160, after all of the decision cells have been considered, control passes to block 142. At block 142, processor 21 skips again to the beginning of the sequence.

After block 142 control passes to block 86 in FIG. 8 where PLC 12 identifies the next cell in the sequence (i.e., the first sequence cell the first time through block 86). Next, at block 94, PLC 12 executes the next cell and identifies the ROCs associated with the executed next cell as a function of the decision cell path specifications. To this end, where the next cell follows a first decision cell and an associated conditional section of a sequence where the decision cell was designated a help cell at block 152 (see again FIG. 7), block 94 will be performed twice, once for each of the two paths through the first conditional sequence section. Similarly, where the next cell follows two conditional sequence sections where each of the two associated decision cells were designated help cells at block 152, block 94 will be performed four times, once for each of the four possible paths through the first two conditional sequences, and so on.

At block 96, a cell ID for the current cell path specification and the required ROCs corresponding to the current cell are added to the cell-ROC table (e.g., see 170 in FIG. 9) for each of the cell-path specifications. Thus, in the above example where a cell follows two conditional sequence sections, the cell identifier will be lists four times, once for each one of the four possible paths through the conditional sections, and different ROCs will be stored for each one of the specified paths.

Continuing, at block 98, PLC 12 determines whether or not all of the cells in the sequence have been executed for each possible path. Where all of the cells have not been executed, control passes back up to block 86 where PLC 12 identifies the next cell and the process described above is repeated. Once all of the cells have been executed at block 98, control passes back to block 100 in FIG. 7.

Referring now to FIG. 9, an exemplary cell-ROC table 170 is illustrated which includes a cell column 172, a path specification column 174 and required ROCs column 176. Cell column 172 lists each of the sequence cells at least once by numeral. In FIG. 9 only three cells including cell numbers 1, 2 and 3 are listed. Cell number 3 is listed twice indicating that the ROCs associated with cells 3 are dependant upon information that may be provided by a system operator during a restart process. While cell number 3 is listed only twice, it is contemplated that cell number 3 may be listed a large number of times, the number of times listed depending upon the number of decision cells that were labeled help cells at block 152 in FIG. 8. Thus, for instance, in the above example where a cell follows two decision cells where each of the decision cells was designated a help cell, the cell would be listed four times in cell column 172. Similarly, where cell 3 follows four conditional sections associated with help cells, cell 3 may be listed as many as 16 times (i.e., two to the fourth), once for each possible path through the four conditional sections.

Help cell specification column 174 includes an entry for each one of the instances of a cell number in column 172. As illustrated, for each of cell numbers 1 and 2, a NA indicating not applicable, is provided in column 174 which indicates that each of cells 1 and 2 occur prior to any help cells in the sequence. For each instance of cell number 3 in column 172, a series of four numbers is provided in column 174. Each of the numbers in each of the series corresponds to a different help cell identified at block 152 in FIG. 8. Thus, in the present example, because there are four numbers in each series in column 174, the operator that performed process 80 identified four separate decision cells as having two paths for restart purposes at block 46. Each number in one of the series in column 174 is either a 1 or a 2. A "1" indicates selection of the first path through a conditional section of a sequence and a "2" indicates selection of the second path through a conditional section of a sequence. Thus, during a restart process, if an operator selects the first path when each of the help cells is encountered, the operator will select the help cell specification associated with the first instance of cell number 3 in column 174 (i.e., will select a help cell specification "1,1,1,1"). If the operator selects the first path when each of the first three help cells are encountered and the second path when the four help cell is encountered, the operator will select the help cell specification corresponding to the second instance of cell number 3 in table 170.

Required ROCs column 176, as its label implies, provides a subset of required ROCs that are required to restart the sequence associated with table 170 for each combination of a cell number and a path specification in columns 172 and 174. Thus, for instance, five required ROCs are listed in column 176 for cell 1, three required ROCs are listed for cell 2 and so on. As illustrated, for cell 3, two separate required ROC subsets are provided, a separate subset for each specific path specification instance in column 174. Thus, for the first instance of cell number 3 in column 172, the ROC subset in column 176 requires that clamp 1 must be closed and that drill 1 must be parked whereas, for the second instance of cell number 3 in column 172, ROCs column 176 requires that clamp 1 be open and that drill 1 be in a forward position. Many other ROC sets for cell 3 and various path specifications are contemplated.

Referring now to FIG. 10, a MSR process 102 to be performed when a PLC stops or halts a sequence that is consistent with at least some aspects of the present invention is illustrated. At block 104, normal PLC operation is assumed. At block 106, PLC 12 monitors to determine when the sequence is halted. As long as the sequence is not halted, control continues to loop back up to block 104 where the PLC continues to operate in a normal fashion. Once the sequence is halted, control passes to block 108 where PLC 12 indicates to the interface processor 21 that the sequence has been halted and, in response, the interface processor indicates the current/halt cells via the interface by changing the color of the halt cells to blue. In addition, at block 108, the interface processor 21 provides the compliment of touch selectable screen icons illustrated in FIG. 2 in field 22 along with an error stack in field 26. Referring again to FIG. 2, to start a MSR process, the operator selects MANUAL icon 36 and then the MSR/RE-SEQUENCE icon 34.

Next, at block 110, the interface processor 21 monitors the display 18 to determine if the operator has selected a cell other than one of the halt cells within the sequence 42 displayed in field 24. If the operator has not selected another cell, control passes back up to block 108 where the halt cells continue to be indicated via a blue color. Once the operator selects another cell at block 110, control passes to block 112.

At block 112, interface processor 21 accesses the database storing help cell identifiers and related path names and identifies the help cells and related path names. At block 114, processor 21 steps through each of the help cells and requests that the operator identify one of the two possible paths associated with each of the help cells. This presentation can be via text query in field 22 (see again FIG. 2) and selection may be via presentation of touch selectable icons that correspond to the choices. Here, the related path names can be used to provide context in which the operator can determine which path to select.

Where the operator selects a path name corresponding to a first of the paths associated with a help cell, a "1" is added to the path specification. Similarly, where the operator selects a path name corresponding to the second path associated with a help cell, a "2" is added to the path specification. After the operator has selected one path for each of the help cells and therefore, a path specification akin to the specifications of column 174 in table 170 has been defined, control passes to block 118. At block 118, interface processor 21 accesses the ROCs for selected cells and the specified path specification in the look-up table. At block 120, PLC 12 identifies the current ROCs and provides the current ROCs to processor 21. At block 122, processor 21 compares the current ROCs to the required ROCs identified from table 170. At block 124, where no differences exist between the current and required ROCs, control passes to block 130 where the selected cell is visually distinguished by rendering the cell green. After block 130, control passes to block 132 where PLC 12 monitors for selection of START icon 40. Once START icon 140 is selected, control passes back up to block 104 where normal PLC operation is restarted. As long as the START icon is not selected, control passes from block 132 back up to block 108 where the process described above is repeated.

Referring once again to block 124, where differences do exist between the current and required ROCs for the selected cells, control passes to block 126 where the differences are indicated textually in the error stack in field 26. In addition, the selected cell is visually distinguished by rendering the cell yellow in field 24 at block 128. After block 128, control passes back up to block 108 where the process described above is repeated.

When the sequence halts, to start the resequence process, while the system is still in automatic mode, the operator simply selects the MSR/RESEQUENCE icon 34 (see again FIG. 2). When icon 34 is selected processor 21 performs the resequencing process described above and either identifies cells at which the sequence can be restarted or indicates that a different restart process is required.

It should be understood that the methods and apparatuses described above are only exemplary and do not limit the scope of the invention, and that various modifications could be made by those skilled in the art that would fall under the scope of the invention. For example, while the inventive concepts are described above in the context of a system that simply provides an error stack indicating the differences between current ROCs and ROCs required to restart a sequence at a selected cell, at least some of the concepts are also applicable in cases where all intervening cell process steps have to be manually performed to restart at a selected cell. For instance, in at least some cases, when a cell subsequent to a halt cell is selected for restart, while the cell color would be changed to yellow to indicate a ROC mismatch consistent with the teaching above, the error stack may include a list of all process steps associated with all cells that intervene between the halt and selected cell to guide an operator to manually step through the sequence section associated with the intervening cells.

In addition, other embodiments are contemplated wherein a person commissioning the sequence may be given the opportunity to step through the sequence during a learning process once for each possible complete path therethrough to specify path specifications to be supported by the system. For instance, in a simple case, while there may be a huge number of distinct paths through a sequence, it may be that only four paths will ever occur or be selected by an operator. In this case, during the learning process, prior to identifying cell-ROC relationships, the four paths may be specified by the operator. Thereafter, the PLC may run the learning process for each path and store an abbreviated table like table 170 that only supports the four paths through the sequence.

To this end, a sub-process 200 that may be substituted for a section of the process 80 of FIGS. 7 and 8 is illustrated in FIG. 11. Referring to FIGS. 7 and 11, after blocks 92 in FIGS. 7, control may pass to block 204 in FIG. 11. At block 204 interface processor 21 requests and receives a name for a next path to be defined by the operator. Here, as above, processor 21 may be programmed to provide text queries and instructions via field 26 (see again FIG. 2) along with some type of text entry tool such as a touch screen keyboard or the like. Once a path name has been specified control passes to block 205.

At block 204, processor 21 identifies the next decision cell in the sequence and at block 206 processor 21 requests the operator to select one of the paths through the conditional sequence section associated with the next decision cell. At block 208 the selected path is stored as a default path for the named path.

Continuing, at block 210, interface processor 21 determines if all of the decision cells In the sequence have been considered. Where additional decision cells exist that have not been considered, control passes back up to block 205 where the process above is repeated. If all of the decision cells have been considered, referring again to FIG. 9, a path specification akin to the specification in column 174 results.

If all the decision cells have been considered at block 210, control passes to block 212. At block 212, processor 21 stores the name of the sequence path along with the specified path in the interface memory 20. At block 214 processor 21 queries if there is another path to learn. If another path exists, at block 216 control passes back up to block 202 where processor 21 skips to the beginning of the sequence and the process above is repeated. If no more paths are to be specified, control passes back to block 142 in FIG. 7 from block 216 where the ROC identifying process is performed for each cell and for each specified path, the abbreviated cell-ROC table being stored in memory 20.

Subsequently, during normal operation of the PLC, if the sequence is halted, a process similar to that described above with respect to FIG. 10 occurs. Here, however, block 114 would query the operator to select one of the sequence paths by name that was defined during the commissioning process. Thereafter, the FIG. 10 process would be executed in a fashion similar to that described above.

Moreover, the interface may be used without the learning process and vice versa.

To apprise the public of the scope of this invention, the following claims are made:

What is claimed is:

1. A method for use with a system including a processor that controls a resource configuration to perform a sequence including a plurality of cells, the method for programming the processor to help a system operator restart the sequence after the sequence is halted, the method comprising the steps of, during a commissioning procedure:

providing a sequence including at least one conditional section including at least one decision cell that determines which of at least two different subsets of conditional cells (cell subsets) to perform during the at least one conditional section;

beginning with the first sequence cell, performing each cell;

after each cell is performed:

(i) identifying resource operating characteristics (ROCs);

(ii) correlating the identified ROCs with a cell identifier; and (iii) storing the identified ROCs as required ROCs along with the cell identifier for subsequent use during a restart procedure.

2. The method of claim 1 also for aiding a system operator in restarting the sequence after the sequence halts, the method further including the steps of, after the sequence has halted during normal operation to control the resources, identifying at least one cell at which the sequence is to be restarted, accessing the stored identifier and ROCs associated with the selected cell and retrieving the required ROCs for the selected cell.

3. The method of claim 2 wherein the step of identifying at least one cell includes receiving a cell selection from an operator.

4. The method of claim 2 further including the steps of identifying current ROCs for the resources, identifying differences between the required ROCs retrieved for the selected cell and current ROCs and presenting an error stack to the operator indicating the differences.

5. The method of claim 4 further including the step of providing an interface including a display screen for communicating with the operator, the interface including an error stack field and a flow chart field, the step of presenting the error stack including textually listing the differences in the error stack field, the method also including presenting a flow chart graphically illustrating at least a portion of the sequence in the flow chart field and at least one input device for selecting a cell from the flow chart.

6. The method of claim 5 wherein the step of providing at least one input device further includes providing a control panel field on the display including touch sensitive icons for selecting flow chart cells.

7. The method of claim 1 wherein the required ROCs for at least one cell subsequent to the at least one conditional section are dependent on which conditional path is performed and wherein the step of virtually performing each cell includes, for at least a subset of cells, virtually performing each cell at least twice, the step of identifying ROCs including, after each performance of the cell, identifying resource operating characteristics (ROCs), the step of correlating including, after each performance of the cell, correlating the identified ROCs with a cell identifier and one of the paths through the conditional section and the step of storing including, after each performance of the cell, storing the identified ROCs as required ROCs along with the cell identifier and a conditional path identifier for subsequent use during a restart procedure.

8. The method of claim 7 further including the step of requesting an operator to provide labels for each of the paths through the conditional section.

9. The method of claim 7 further including the steps of, after the sequence has halted during normal operation to control the resources, receiving a cell selection from a system operator indicating at least one of the cells at which to restart the sequence along with an indication for the at least one conditional section of a path to assume through the section; accessing the stored identifiers and ROCs associated with the selected cell and selected path and retrieving the required ROCs for the selected cell and selected path.

10. The method of claim 9 wherein the sequence includes several conditional sections and wherein the required ROCs for at least one cell subsequent to the conditional sections are dependent on which conditional paths through the combination of conditional sections are performed and wherein the step of virtually performing each cell includes, for at least a subset of cells, virtually performing each cell several times, once for each of at least a subset of the possible combinations of conditional paths, the step of identifying ROCs including, after each performance of the cell, identifying resource operating characteristics (ROCs), the step of correlating including, after each performance of the cell, correlating the identified ROCs with a cell identifier and one of the path subsets through the conditional sections and the step of storing including, after each performance of the cell, storing the identified ROCs as required ROCs along with the cell identifier and a conditional path specification indicating the paths through the conditional sections for subsequent use during a restart procedure.

11. The method of claim 9 further including the steps of identifying current ROCs for the resources, identifying differences between the required ROCs retrieved for the selected cell and conditional section path and current ROCs and presenting an error stack to the operator indicating the differences.

12. The method of claim 11 further including the step of providing an interface including a display screen for communicating with the operator, the interface including an error stack field and a flow chart field, the step of presenting the error stack including textually listing the differences in the error stack field, the method also including presenting a flow chart graphically illustrating at least a portion of the sequence in the flow chart field and at least one input device for selecting a cell from the flow chart.

13. The method of claim 1 further including the step of, during the commissioning procedure, for at least a subset of the conditional sections, requesting the operator to select one path through the conditional section to be assumed during a restart procedure.

14. The method of claim 13 wherein the step of virtually performing each cell includes performing each cell subsequent to the selected path assuming the selected path has occurred.

15. The method of claim 1 wherein the step of performing the sequence includes virtually performing the sequence.

16. A method for use with a processor that controls a resource configuration to execute a sequence that includes a plurality of cells, the method for generating a database including resource operating characteristics (ROCs) associated with each of the cells that are required prior to the process being restarted at the associated cells, the method comprising the steps of, during a commissioning procedure:

(a) executing the sequence cells in the order specified by the sequence; and
(b) for each cell:
(1) determining the ROCs after executing the cell;
(2) correlating the ROCs and the cell; and
(3) storing the correlated ROCs and cell in the database for subsequent use.

17. The method of claim 16 wherein the sequence includes at least one conditional section including at least one decision cell that determines which of at least two subsets of conditional cells (cell subsets) to perform during the at least one section wherein ROCs at the ends of the cell subsets are distinct and may affect subsequent cells, the method further including the steps of, for the at least one conditional section, when the conditional section occurs during performance of the sequence, requesting the operator to select one of the cell subsets as a default cell subset to be assumed when the sequence stops during subsequent resource operation.

18. The method of claim 17 further including the step of, after a default cell subset has been selected, performing the default cell subset to identify cell subset ROCs that exist upon completion of the cell subset and correlating and storing the cell subset ROCs with the conditional section for subsequent use.

19. The method of claim 18 wherein, after the cell subset ROCs are stored with the conditional section, the method further includes continuing to perform the sequence via the processor assuming the cell subset ROCs occur at the end of the at least one conditional section to generate ROCs for cells subsequent to the at least one conditional section.

20. The method of claim 19 wherein there are several conditional loops and wherein the process is repeated for each of the conditional loops.

21. The method of claim 16 also for subsequent use when the processor runs the sequence and controls the resource configuration to identify ROCs required to restart the resource configuration at a cell after the resource configuration unexpectedly stops, the method further including the step of, when the resource configuration stops while performing the sequence, identifying one of the cells during which the resource configuration should restart operations.

22. The method of claim 21 further including the steps of identifying the current ROCs, comparing the current ROCs to the ROCs in the database to identify a most similar ROC set including ROCs associated with a cell that are most similar to the current ROCs and indicating at least some status information to an operator via a visual display regarding the current ROCs.

23. The method of claim 22 wherein the step of identifying one of the cells includes the step of receiving a selection from the operator indicating one of the cells at which to restart the process.

24. A method for use with a processor that controls a resource configuration to perform a sequence that includes a plurality of cells where there are cell specific resource operating characteristics (ROCs) that are required prior to associated cells being performed, the method for guiding a configuration operator to place the resources in a condition suitable for restarting the sequence after the sequence is stopped, the method comprising the steps of, when the sequence stops during a first cell:
(a) providing a database that correlates cells with cell specific ROCs (cell ROCs) required to restart the sequence at the associated cell;
(b) identifying a cell at which to restart the process;
(c) accessing the database and identifying the cell ROCs associated with the identified cell;
(d) identifying the current ROCs;
(e) comparing the current ROCs and the identified cell ROCs to identify differences; and
(f) where differences exist, indicating the differences to a system operator.

25. The method of claim 24 wherein the step of identifying a cell at which to restart includes receiving an indication from the system operator indicating one of the cells at which to restart.

26. The method of claim 25 also for use with a visual display wherein the step of receiving an indication includes receiving an indication via the display.

27. The method of claim 26 further including the step of presenting a flow chart representation of the cells to the operator via the display and requesting that the operator select the cell at which to restart from the flow chart.

28. The method of claim 24 wherein the step of indicating the differences includes providing instructions to the operator indicating the resource conditions that have to be altered for the current ROCs to be identical to the cell ROCs.

29. The method of claim 24 wherein the step of identifying a cell at which to restart includes comparing the current ROCs to at least a subset of the cell ROCs stored in the database to identify a most similar cell ROC set that includes resource characteristics that are most similar to the current ROCs and identifying the cell associated with the most similar cell ROCs as the cell at which to restart the sequence.

30. The method of claim 29 wherein the step of indicating the differences includes providing instructions to the operator indicating the resource conditions that have to be altered for the current ROCs to be identical to the most similar cell ROCs.

31. The method of claim 24 wherein the step of identifying a cell at which to restart the process includes identifying a cell other than the first cell.

32. A method for use with a processor that controls a resource configuration to perform a sequence where the sequence includes a plurality of cells where cell specific resource operating characteristics (ROCs) are required prior to associated cells being performed, the method comprising the steps of:
(a) during a commissioning procedure:
(1) for at least a subset of conditional sections of the sequence, requesting information from an operator regarding at least two paths through the conditional section;
(2) performing the sequence via the processor to identify cell specific ROCs (cell ROCs) for each of the cells as a function of the information regarding the at least two paths; and
(2) storing each of the cell ROCs with associated cell identifiers and conditional section path identifiers in a database; and
(b) subsequent to the commissioning procedure and during performance of the program to control the resources to perform the sequence, when the sequence halts, using the database to identify required ROCs that are required to restart the sequence.

33. The method of claim 32 further including the step of, when the sequence halts, for at least one of the conditional sections, requesting the operator to specify one of the at least two paths through the conditional section, receiving the specified path and identifying a cell at which to restart the sequence, the step of using the database to identify required ROCs including using the specified path and cell to identify the required ROCs.

34. The method of claim 33 wherein the step of using the database to identify the required ROCs includes receiving an indication from a system operator indicating one of the cells at which to restart the sequence, accessing the database and identifying the ROCs associated with the selected cell and the specified path as the required ROCs.

35. A method for use with a processor that controls a resource configuration to perform a sequence that includes a plurality of cells where there are cell specific resource operating characteristics (ROCs) that are required prior to associated cells being performed, the method for guiding a configuration operator to place the resources in a condition suitable for restarting the sequence after the sequence is stopped, the method comprising the steps of, when the sequence stops at a first cell or first set of cells:

proving a graphical representation of at least a subset of the sequence cells via a display;

receiving a selection of at least one of the displayed cells from a system operator other than the first cell or set of cells at which to restart the sequence; and identifying ROCs required for restarting the sequence at the at least one selected cell.

36. The method of claim 35 wherein the step of providing a graphical representation includes providing a flow chart from which sequence cells may be selected.

37. The method of claim 35 also for use with a database that correlates cells with the cell specific ROCs (cell ROCs) required to restart the process at associated cells, the step of identifying ROCs required to restart including accessing the database and identifying ROCs associated with the at least one selected cell.

38. The method of claim 35 further including the steps of identifying current ROCs for the resources, identifying differences between the required ROCs identified for the at least one selected cell and current ROCs and presenting an error stack to the operator indicating the differences.

39. A method for use with a processor that controls a resource configuration to perform a sequence that includes a plurality of cells where there are cell specific resource operating characteristics (ROCs) that are required prior to associated cells being performed, the method for guiding a configuration operator to place the resources in a condition suitable for restarting the sequence after the sequence is stopped, the method comprising the steps of, when the sequence halts:

identifying the current resource ROCs;

graphically representing at least a section of the sequence including the at least one cell at which the sequence halted via a display screen;

providing a selection tool for selecting at least one graphically represented cell;

when one of the cells is selected via the selection tool:
(i) identifying ROCs required to restart the sequence at the selected cell;
(ii) comparing the current and required ROCs to identify differences; and
(iii) providing at least some indication regarding the results of the comparison of the current and required ROCs.

40. The method of claim 39 wherein the step of graphically representing includes visually distinguishing the at least one cell at which the sequence halted from the other graphically represented cells.

41. The method of claim 39 wherein the step of graphically representing includes presenting at least a section of the sequence in flow chart form where the flow chart includes a separate cell representation for each of the sequence cells in the displayed section.

42. The method of claim 41 wherein the step of providing at least some indication includes, when the current and required ROCs match, visually distinguishing the selected cell from the other cells represented on the display.

43. The method of claim 42 wherein the step of providing at least some indication includes, when the current and required ROCs are different, visually distinguishing the selected cell from the other cells represented on the display in a manner different than the manner in which the selected cell is distinguished when the current and required ROCs match.

44. The method of claim 43 wherein the step of graphically representing includes visually distinguishing the at least one cell at which the sequence halted from the other graphically represented cells in a manner different than the manner in which the selected cells are distinguished when the current and required ROCs match and in a manner different than the manner in which the selected cells are distinguished when the current and required ROCs are different.

45. The method of claim 44 wherein, when the current and required ROCs match, the selected cell is visually distinguished by rendering the cell representation in a first color, when the current and required ROCs are different, the selected cell is visually distinguished by rendering the cell representation in a second color and wherein the at least one cell at which the sequence halted is rendered in a third color.

* * * * *